United States Patent [19]

Auerbach et al.

[11] Patent Number: 4,731,397

[45] Date of Patent: * Mar. 15, 1988

[54] THERMAL STABILIZATION OF ACETAL POLYMERS

[75] Inventors: Andrew B. Auerbach, Livingston; Tom C. Yu, Chatham, both of N.J.

[73] Assignee: Celanese Corporation, New York, N.Y.

[*] Notice: The portion of the term of this patent subsequent to Mar. 15, 2005 has been disclaimed.

[21] Appl. No.: 778,348

[22] Filed: Sep. 20, 1985

[51] Int. Cl.$^4$ .................. C08K 5/34; C08F 283/00
[52] U.S. Cl. ................................ 523/439; 523/333; 523/461; 524/100; 524/101; 524/502; 524/512; 524/513; 524/539; 524/542
[58] Field of Search ............... 523/439, 461, 333; 524/100, 101, 502, 513, 512, 539, 542

[56] References Cited

U.S. PATENT DOCUMENTS

| | | | |
|---|---|---|---|
| 2,993,025 | 7/1961 | Alsup et al. | 524/343 |
| 3,424,819 | 1/1969 | Green | 524/100 |
| 4,098,843 | 7/1978 | Johnson | 525/183 |
| 4,208,320 | 6/1980 | Chono et al. | 523/461 |
| 4,342,680 | 8/1982 | Sugio et al. | 524/100 |
| 4,351,916 | 9/1982 | Kohan | 525/154 |
| 4,386,178 | 5/1983 | Schuette et al. | 524/100 |
| 4,394,468 | 7/1983 | Lu | 524/502 |

Primary Examiner—John Kight
Assistant Examiner—Kriellion Morgan
Attorney, Agent, or Firm—Marvin Turken

[57] ABSTRACT

Stabilized acetal polymer molding compositions are formed by first preparing an intimate dispersion of cyanoguanidine or melamine in a carrier resin, e.g. a nonionic carrier resin such as an ethylene/ethyl acrylate copolymer, and compounding the dispersion with the acetal polymer. The resulting composition is found in many cases to have improved thermal stability over compositions prepared by adding the cyanoguanidine or melamine as pure crystals.

11 Claims, No Drawings

THERMAL STABILIZATION OF ACETAL POLYMERS

BACKGROUND OF THE INVENTION

This invention relates to acetal polymers having improved thermal stability.

Molding compositions comprising acetal polymers have been in commercial use for many years. They have application in a wide variety of end uses, e.g. automobile applications such as bumper extensions and instrument panels, plumbing supplies such as valves, shower assemblies, flush tank components, faucets and pipe fittings, tool components such as screw driver adaptors, and household and personal products, such as quick boiling electric water kettles, clothes hangers and combs.

While acetal polymers have a highly favorable spectrum of physical properties which are responsible for their wide commercial acceptance, the unmodified polymer tends to suffer some thermal and oxidative degradation when subjected to elevated temperatures, e.g., over 200° C. Thus various expedients have been proposed for minimizing this problem, including in the product area, the addition of phenolic anti-oxidants as disclosed in U.S. Pat. Nos. 3,103,499 and 3,240,753 and the addition of amidine compounds alone or in conjunction with amino substituted amides as thermal stabilizers for the polymer as taught by U.S. Pat. Nos. 3,313,767 and 3,314,918. The stabilizers are generally considered to function as formaldehyde and acid scavengers. Process expedients for the improvement of the thermal properties of the polymer include various types of hydrolysis designed for acetal copolymers containing carbon to carbon bonds in the polymer chain, e.g. oxymethylene-oxyethylene copolymers, as disclosed, for example in U.S. Pat. Nos. 3,174,948; 3,219,623; 3,318,848; and 3,418,280, and the endcapping of hemiformal groups of oxymethylene homopolymers by acylation or etherification, e.g. as disclosed in U.S. Pat. No. 3,170,896.

Two of the most effective amidine stabilizers used in acetal polymer compositions are cyanoguanidine and melamine. However, although the employment of either of these stabilizers, particularly in combination with the other expedients set out previously, yields acetal polymer compositions satisfactory for many applications, there exist other applications for which an even greater degree of thermal stability is desirable. Moreover, any expedient having the effect of increasing the efficacy of the stabilizer so that a desired degree of stabilization can be achieved with a reduced amount of stabilizer is considered highly advantageous.

Also known in the art as disclosed in U.S. Pat. No. 4,098,843 of Johnson is the predispersion of any of certain superpolyamide stabilizers in a carrier resin, which is subsequently admixed with an acetal polymer. The cited patent states that the use of a predispersion of the polyamide has the effect of reducing mold deposits during the molding of the acetal polymer.

U.S. Pat. No. 4,351,916 of Kohan discloses a variation of the process described in U.S. Pat. No. 4,098,843, wherein both the polyamide stabilizer and a poly(ethylene glycol), added to reduce melt viscosity, are predispersed in a carrier resin which is then admixed with the acetal polymer. It is stated by the patentee that in this process, the effect of the predispersion is to reduce the destabilizing effect caused by impurities in the poly(ethylene glycol). The patentee also states that "U.S. Pat. No. 4,098,843 shows no stabilizing advantage over U.S. Pat. No. 2,993,025 and, indeed, carries the implication of larger additive requirements for comparable stability because of the presence of the carrier resin." (column 1, lines 36-40). The second-cited patent in the foregoing quotation, U.S. Pat. No. 2,993,025, contains the original disclosure of the use of polyamides as stabilizers for acetal polymers (polyoxymethylenes).

Pending application Ser. No. 644,796 filed Oct. 25, 1984, now U.S. Pat. No. 4,582,405, by A. B. Auerbach and K. M. Natarajan discloses a method of reducing black speck formation caused by compounding acetal polymers and polyamides having a melting or softening point below that of the acetal polymer by adding the polyamide to the acetal polymer as a dispersion in a carrier resin.

SUMMARY OF THE INVENTION

In accordance with this invention, an acetal polymer is stabilized with cyanoguanidine (CNG) or melamine by first thoroughly dispersing the CNG or melamine in a carrier resin inert to the acetal polymer and other additives present to form a concentrate or predispersion, and the concentrate is then compounded with the acetal polymer. The temperature of dispersion is above the melting, sublimation initiation, or softening point of all the materials present including the CNG or melamine and the carrier resin. The carrier resin preferably has a melting or softening point below or equal to the melting point of the acetal polymer.

The acetal polymer may be an oxymethylene homopolymer, e.g. a homopolymer of formaldehyde or trioxane, the hemiformal groups of which have been endcapped by acylation or etherification as disclosed, for example in U.S. Pat. No. 3,170,896. Preferably, however, the acetal polymer is an oxymethylene copolymer prepared by copolymerizing trioxane with 0.1 to 15 mole percent of a cyclic ether having at least two adjacent carbon atoms. Copolymers of this type are described in U.S. Pat. No. 3,027,352 of Walling et al. Such copolymers may be described as having at least one chain containing between about 85 and about 99.9 mole percent oxymethylene ($-OCH_2$) units interspersed with between about 0.4 and 15 mole percent of $-O-R-$ units wherein R is a divalent radical containing at least two carbon atoms directly linked to each other and positioned in the chain between the two valences with any substituent in the R radical being inert. The preferred copolymers are those made up of oxymethylene and oxyethylene groups, such as copolymers of trioxane with dioxolane or with ethylene oxide.

Also contemplated as the acetal polymer are terpolymers prepared, for example, by reacting trioxane and a cyclic ether and/or cyclic acetal such as in the preparation of the oxymethylene copolymer, with a third monomer which is a bifunctional compound such as ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1,4-diol and 2-dimethyl-4-dimethylcyclobutane-1,3-diol, with butanediol diglycidyl ethers being most preferred. The bifunctional compound may be used for example in the range of 0.1 to 10 percent based on the weight of the total monomers. The terpolymers may be prepared using the same methods known in the art for preparing the copolymers, including the variations for terpolymers disclosed, for example in previously cited application Ser. No. 644,796, the entire disclosure of which is incorporated by reference.

The amount of CNG or melamine used will vary depending upon the particular acetal polymer used and the degree of stability desired. Generally, the amount of CNG or melamine used is from about 0.01 to about 10.0 weight percent, based on the weight of the acetal polymer, preferably from about 0.01 to about 1.0 weight percent, and most preferably from about 0.1 to about 0.5 weight percent, for example, about 0.25 weight percent.

CARRIER RESIN

The particular polymeric carrier resin into which the CNG or melamine is dispersed generally melts or softens at or below about 160° C. and preferably at or below the melting or softening point or temperatures of the acetal polymer and is inert to such polymer as well as to the other additives present, that is, the carrier resin is one which does not adversely affect the properties of the acetal polymer composition with which it is to be admixed. For satisfactory preparation of the CNG or melamine-carrier resin dispersion (hereinafter referred to as the "stabilizer-carrier resin dispersion") and its subsequent use in the acetal polymer, the carrier resin should have a decomposition temperature higher than the temperatures used during the acetal polymer compounding and molding operations and higher than the temperatures used during the formation of the stabilizer-carrier resin dispersion.

Within these guidelines, a wide variety of specific carrier resins can be used, as will be evident to those skilled in the art. These include, for example, non-ionic polymers such as polyethylene and copolymers of ethylene with methyl acrylate, ethyl acrylate, vinyl acetate, acrylonitrile, carbon monoxide, or methyl methacrylate, and especially ethylene-ethyl acrylate copolymers containing from about 10 to 30 weight percent ethyl acrylate and having a melt index of from about 0.5 to 100, and preferably from about 1 to 20. Still other materials which can be used as the carrier resin include methacrylate and acrylate copolymers, such as polymethyl methacrylate containing about from 4 to 15 percent ethyl acrylate, copolyesters, polyether-esters, polystyrene, styrene-acrylonitrile copolymers, polyethylene oxide, polyether homo and copolymers and mixtures of two or more of the above polymers.

Also suitable as carrier resins are ionic polymers, e.g. the copolymer salts prepared by at least partially neutralizing the carboxyl groups of a low molecular weight copolymer of an alpha-olefin and an alpha, beta ethylenically unsaturated carboxylic acid. Some of these copolymer salts are disclosed for example in U.S. Pat. Nos. 4,381,376 and 4,412,040.

Mixtures of any of the foregoing polymers are also contemplated as the carrier resin, e.g. mixtures of a non-ionic polymer such as an ethylene-ethyl acrylate copolymer and an ionic polymer.

It is preferred that the carrier resin polymers are linear rather than cross-linked.

Particularly preferred carrier resins are copolymers of ethylene with ethyl acrylate or vinyl acetate such as those commercially available from Union Carbide under the designation BAKELITE ® Ethylene Copolymer DPD-6169 Natural which is a copolymer of ethylene and 18% ethyl acrylate having a typical melt index of 6 g/10 min. (ASTM D 1238) a typical density of 0.931 g/cm$^3$ (ASTM D 1505) and a typical Vicat softening point of 64° C. (ASTM D 1525); DPDA-6182 Natural which is a copolymer of ethylene and 15% ethyl acrylate having a typical melt index of 1.5 g/10 min., a typical density of 0.930 g/cm$^3$ and a typical Vicat softening point of 66° C.; and DQDA-6479 Natural 7 which is a copolymer of ethylene and 10 weight percent of vinyl acetate based on the weight of the copolymer, having a typical melt index of 1.9 g/10 min and a typical density of 0.930 g/cm$^3$. The most preferred carrier resin is DPDA-6182 Natural, which has a softening temperature range of about 110° C. to about 120° C.

In the preparation of the instant dispersions, the CNG or melamine and the carrier resin are first blended at a temperature above the melting or softening temperatures of the carrier resin and above the melting or sublimation initiation temperature of the CNG or melamine. These components are generally blended in a high shear mixing device of the type known in the art, to disperse the CNG or melamine in the carrier resin as fine particles.

The stabilizer-carrier resin dispersion should in most cases contain less than about 50 weight percent of CNG or melamine, preferably from about 12 to about 40 weight percent.

Any convenient apparatus can be used for admixing the carrier resin and the CNG or melamine, typically at a temperature within the range of about 160° C. to about 300° C. The degree of shear in the admixing of the acetal polymer and carrier resin should be high enough to achieve a fairly intimate blend and the effectiveness of any particular mixing procedure may depend on the specific nature of materials being mixed e.g. their compatibility, melt viscosity, particle size, etc. For example, pigmented molding compositions may require a higher degree of shear in the preparation of the stabilizer dispersion than non-pigmented molding compositions. In one preferred blending procedure, CNG or melamine, and carrier resin granules are first dry blended and then melt extruded in a high shear single or twin screw extruder, followed by cutting the extruded strands into pellets. In some instances, the pelletizer strand bath water should be kept below about 25° C. to about 30° C. in order to adequately cut the strands.

The stabilizer-carrier resin dispersion is admixed with acetal polymer at a temperature above the melting or softening temperatures of the acetal polymer and the carrier resin to obtain as uniform a mixture or intimate blend of the acetal polymer and the stabilizer-carrier resin dispersion as possible.

In general, the stabilizer-carrier resin dispersion is used in an amount of from about 0.03 to about 30 weight percent, and preferably from about 0.03 to about 3 weight percent, based on the weight of the acetal polymer.

The molding compositions may suitably be prepared by any conventional compounding or mixing procedure that will result in an intimate blend or mixture of the components. Preferably, dry or melt blending procedures and equipment are used. For example, the stabilizer-carrier resin dispersion can be dry mixed with the acetal polymer (in the form of pellets, chips, granules or powder) typically at room temperature, and the resulting mixture melt blended in any conventional type extrusion equipment, which is heated to a temperature of from about 180° C. to about 230° C., and preferably from about 185° C. to about 205° C. If desired, an inert atmosphere such as a nitrogen blanket or purge may be used during the compounding operation.

The acetal polymer molding composition resulting from the compounding procedure is then comminuted mechanically, for example, by chopping, pelletizing or grinding, into granules, pellets, chips, flakes or powders.

It is within the ambit of the present invention that the acetal polymer molding composition also include, if desired, plasticizers, other formaldehyde scavengers, mold lubricants, antioxidants, fillers, colorants, particulate or fibrous reinforcing agents, e.g. glass fiber, light stabilizers, pigments, other stabilizers, and the like, so long as such additives do not materially affect the desired properties of the resulting molding composition and the articles molded therefrom. The additional additives can be mixed at any convenient stage in the molding composition preparation, but usually are added when the acetal polymer is being blended or admixed with the stabilizer-carrier resin dispersion.

Other suitable formaldehyde scavengers which may be used in addition to the CNG or melamine include other amidines such as triazines, polyamides, ureas, hydroxyl salts of calcium, magnesium, and the like, salts of carboxylic acids, and metal oxides and hydroxides.

Suitable mold lubricants include alkylene disstearamide, long-chain amides, waxes, oils, and polyether glycides. The preferred mold lubricant is commercially available from Glyco Chemical, Inc. under the trademark "Acrawax C" and is ethylene bisstearamide.

A suitable class of antioxidants are hindered bisphenols such as 1,6-hexamethylene bis-(3,5-di-t-butyl-4-hydroxyhydrocinnamate), commercially available from Ciba-Geigy Corp. under the trademark "Irganox 259."

Acetal terpolymers may also be added to the molding composition as a nucleant e.g. a terpolymer of 97.95 wt.% of trioxane, 2.0 wt.% of ethylene oxide and 0.05 wt.% of butanediol diglycidyl ether, stabilized by 0.5 percent by weight "Irganox 259" and 0.1 percent by weight of cyanoguanidine added in undispersed form. The composition may be modified by substituting calcium hydroxy stearate for the cyanoguanidine.

The molding compositions of the present invention may be processed in the thermoplastic state, for example, by injection molding or extrusion molding, into shaped articles, for example, bars, rods, plates, sheets, films, ribbons, or tubes and the like. The incorporation of the stabilizer-carrier resin dispersion in the acetal polymer molding compositions in many cases enhances the thermal stability of the resulting molding composition as well as the resulting molded objects over that obtained by the addition of CNG or melamine in undispersed form at any specific level of content. Moreover, the addition of the CNG or melamine in dispersed form also results in a marked improvement in the odor of the molding composition or molded article over that resulting from the addition of the stabilizer in undispersed form.

DESCRIPTION OF SPECIFIC EMBODIMENTS

The following examples further illustrate the invention. All parts and percentages in the examples and the remainder of the specification are by weight of the total composition unless otherwise specified.

Control Examples A to D and Examples 1 to 8

Each of the examples employed an acetal copolymer containing oxymethylene and randomly distributed oxyethylene units in the polymer chain, prepared by copolymerizing trioxane and about 2 wt.% of ethylene oxide as disclosed in U.S. Pat. No. 2,986,506. A blend was prepared of 50% of this copolymer melt hydrolyzed as disclosed in U.S. Pat. No. 3,418,280 and 50% of such copolymer solution hydrolyzed as disclosed in U.S. Pat. No. 3,174,948. The resulting acetal polymer had a crystallinity of approximately 75 percent, an inherent viscosity (I.V.) of approximately 1.3 (measured at 60° C. in a 0.1 weight percent solution in p-chlorophenol containing 2 weight percent of alphapinene), a melting temperature of about 165° C., and a melt index of approximately 9.5 g./10 min. when tested in accordance with ASTM method D1238-82.

A dispersion was prepared of 1 part by weight of CNG in 4 parts by weight of an ethylene ethyl-acrylate copolymer carrier resin containing 15% of ethyl acrylate and sold by Union Carbide Corporation as "Bakelite Ethylene Copolymer DPDA-6182 Natural". The CNG and carrier resin were tumbled in a fiberboard barrel for 30 min and the dry mix was then blended in a high or low shear Brabender extruder operated at a barrel temperature of 230° C., a die temperature also of 230° C., and a speed of 100 rpm. The dispersion was pelletized using a strand bath water of below 29° C. CNG as pure crystals or as the foregoing dispersion (in pellet form) was then intimately blended with the previously described acetal copolymer in a ¾" Brabender extruder having a nonvented screw (to maximize the interaction between the CNG and formaldehyde inside the extruder) at a temperature of approximately 180° C. and at a screw speed of 20 rpm (i.e., the longest residence time of polymer inside the extruder). In each instance a further stabilizer package of Irganox 259, Acrawax C and an acetal terpolymer as previously described was added to the extruder so that a final molding composition containing 98.3 percent by weight acetal polymer, 0.5 percent by weight "Irganox 259," 0.2 percent by weight "Acrawax C," 0.5 percent by weight of the acetal terpolymer and varying amounts of CNG from 0.1 to 0.001 weight percent added as pure crystals or in dispersed form, was obtained, weight percents being based on the total weight of the composition.

As an indication of the thermal stability of each of the various samples, its thermal degradation rate at an elevated temperature, extractable formaldehyde and percent volatiles were determined, using the following procedures:

The determination of thermal degradation rate at elevated temperatures (e.g. 230° C., the rate designated as $K_{D230}$) utilized an apparatus consisting of a forced draft oven containing a cylindrical aluminum block, 4 in. high and 14 in. in diameter, as a heat sink. The block was provided with six recesses, ½ in. deep and 2¼ in. in diameter, to accommodate aluminum dishes containing polymer samples. A thermocouple inserted in the block was connected to a recorder-controller system capable of maintaining the block temperature to within ±0.25° C. over the range 200°–270° C.

A guided lid, providing 1 in. of space above the samples when resting on the block, was lifted by a pulley and cable arrangement as the oven door was opened and lowered as the door was closed. A ⅛ in. hole drilled into the top surface of the block and out the side, provided a vent for degradation products to displace the air and escape. Thus, there was limited access of air above the sample; in this respect, the environment to which the polymer was subjected tends toward that prevailing in the barrel of a polymer-processing machine, such as an extruder or injection molding apparatus.

The samples were dried at 100° C. and 25 in. of mercury vacuum for three hours. A polymer sample (5 g.) was accurately weighed (to 0.2 mg.) in a disposable aluminum dish, and placed in the block recess. After 45 min., the sample was removed, cooled in a desiccator to room temperature, and weighed. The percent weight loss, divided by 45 min., gave a $K_{D230}$ value which is the average percent weight loss per minute at 230° C. The coefficient of variation for values determined by this method was 4-7%.

For the determination of extractable formaldehyde, (Ext. $CH_2O$) a 100 gram sample of the acetal polymer composition was added to 100 ml of distilled water and refluxed at boiling for 60 minutes. The sample was neutralized with potassium hydroxide (0.10N) solution and the final pH noted. Fifty (50) milliliters of sodium sulfite solution (1.0M) was added to the neutralized solution. This final solution was then titrated with sulfuric acid (0.10N) to the original pH level noted previously. A value for the formaldehyde level was calculated from the following formula:

$$\% \text{ Formaldehyde} = \frac{T_b \times N(H_2SO_4) \times 3.0}{\text{Sample wt. in grams}}$$

$T_b$ = ml of acid
N = normality of $H_2SO_4$

Volatiles (Vol.) were measured by the following procedure.

Ten grams of sample was accurately weighed, dried in a vacuum oven (25″ vacuum) at 100° C. for one hour and cooled in a dessicator for thirty minutes. The sample was then reweighed and the moisture level determined by use of the following formula:

$$\% \text{ Moisture} = \left(\frac{\text{Original wt.} - \text{wt. after drying}}{\text{Sample Wt.}}\right) \times 100$$

The results are shown in Table I. The CNG was added as pure crystals in Control Examples A to D, as a dispersion in the carrier resin formed in the high shear extruder in Examples 1 to 4, and as a dispersion in carrier resin formed in the low shear extruder, in Examples 5 to 8.

TABLE I

| Example | CNG LEVEL % | $K_{d230}$ %/min | Ext. $CH_2O$ % | Vol. % |
|---|---|---|---|---|
| A | .1 | .037 | .077 | .319 |
| B | .05 | .040 | .083 | .310 |
| C | .01 | .038 | .075 | .319 |
| D | .001 | .075 | .070 | .273 |
| 1 | .1 | .033 | .073 | .295 |
| 2 | .05 | .024 | .060 | .280 |
| 3 | .01 | .025 | .030 | .298 |
| 4 | .001 | .026 | .029 | .175 |
| 5 | .1 | .023 | .045 | .203 |
| 6 | .05 | .021 | .036 | .224 |
| 7 | .01 | .026 | .031 | .219 |

TABLE I-continued

| Example | CNG LEVEL % | $K_{d230}$ %/min | Ext. $CH_2O$ % | Vol. % |
|---|---|---|---|---|
| 8 | .001 | .081 | .028 | .204 |

The results of Table I indicate that CNG generally provides greater improvement in the thermal stability of acetal polymers at various concentration levels, as indicated by the various applicable tests when added as a dispersion in a carrier resin than when added as pure crystals. However, at a level of 0.001 weight percent of CNG in the molding composition a somewhat higher degree of shear in preparing the dispersion is necessary to obtain a sufficiently intimate blend so as to obtain a substantial improvement in thermal degradation rate, than is the case with higher concentrations of CNG.

Control Example E and Example 9

The procedures of the previous examples were generally followed except that the content of the CNG was constant at 0.1 weight and 0.5 weight percent of carbon black was added together with the other additives in blending the CNG dispersion with the acetal polymer. The CNG was added as pure crystals in Control Example E, and as a dispersion in carrier resin prepared in a high shear extruder in Example 9. The results are shown in Table II:

TABLE II

| Example | $K_{d230}$ %/min | Ext. $CH_2O$ % | Vol. % |
|---|---|---|---|
| E | .026 | .021 | .27 |
| 9 | .022 | .026 | .27 |

The results show a somewhat lower thermal degradation rate at 230° C. when the CNG is added as a dispersion prepared with a high shear extruder than as pure crystals. In general, the results indicate that with acetal polymer compositions containing a conventional amount of carbon black, the CNG or melamine should be prepared with a high degree of shear to obtain a substantial benefit of the invention.

Control Examples F to I and Examples 10 to 13

The procedures of the previous examples were followed except that melamine rather than CNG was employed as the stabilizer at concentrations of 0.01 to 0.25 weight percent based on the weight of the composition, and the dispersions of melamine were all prepared in a high shear Brabender extruder at a carrier resin/melamine ratio of 2:1 and an extruder temperature of 270° C. In Control Examples F to I, the melamine was added as pure crystals, while in Examples 10 to 13 the melamine was added as a dispersion in carrier resin. The results are shown in Table III:

TABLE III

| Example | Conc. % | $K_{D230}$ %/Min. | Ext. Form. % | Vol. % |
|---|---|---|---|---|
| F | .01 | .028 | .037 | .22 |
| G | .05 | .029 | .037 | .17 |
| H | .1 | .030 | .041 | .20 |
| I | .25 | .032 | .040 | .22 |
| 10 | .01 | .026 | .040 | .22 |
| 11 | .05 | .024 | .037 | .22 |
| 12 | .1 | .025 | .046 | .22 |

TABLE III-continued

| Example | Conc. % | Ext. $K_{D230}$ %/Min. | Form. % | Vol. % |
|---|---|---|---|---|
| 13 | .25 | .028 | .038 | .22 |

These results show an improvement in thermal degradation rates at 230° C. over the entire concentration rate when the melamine was added to the acetal polymer as a dispersion in carrier resin over the rates obtained when the melamine was added as pure crystals.

We claim:

1. A method of preparing a stabilized acetal polymer composition comprising forming an intimate dispersion of a stabilizer selected from the group consisting of cyanoguanidine and melamine in a carrier resin at a temperature above the softening point of said resins and compounding said dispersion with said acetal polymer, said carrier resin melting or softening at or below about 160° C. and being inert to said acetal polymer as well as to the other additives present.

2. The method of claim 1 wherein said stabilizer is cyanoguanidine.

3. The method of claim 1 wherein said stabilizer is melamine.

4. The method of claim 1 wherein said carrier resin is non-ionic.

5. The method of claim 4 wherein said carrier resin is an ethylene/ethyl acrylate copolymer.

6. The method of claim 1 wherein said dispersion contains up to about 50 weight percent of said stabilizer.

7. The method of claim 6 wherein said dispersion contains from about 12 to 40 weight percent of said stabilizer.

8. A stabilized acetal polymer composition produced by the method of claim 1.

9. A stabilized acetal polymer composition produced by the method of claim 2.

10. A stabilized acetal polymer composition produced by the method of claim 3.

11. The method of claim 1 wherein said carrier resin is a non-ionic polymer selected from the group consisting of polyethylene, copolymers of ethylene with methyl acrylate, ethyl acrylate, vinyl acetate, acrylonitrile, carbon monoxide, or methyl methacrylate, polymethyl methacrylate containing about from 4 to 15 percent ethyl acrylate, copolyesters, polyether-esters, polystyrene, styrene-acrylonitrile copolymers polyethylene oxide, polyether homo and copolymers and mixtures of two or more of the above non-ionic polymers, an ionic polymer selected from the group consisting of copolymer salts prepared by at least partially neutralizing the carboxyl groups of a low molecular weight copolymer of an alpha-olefin and an alpha, beta ethylenically unsaturated carboxylic acid, or a mixture of said non-ionic and ionic polymers.

* * * * *